Aug. 20, 1940.  R. STEENECK ET AL  2,211,868
SPORT TIMING APPARATUS
Filed April 25, 1936  7 Sheets-Sheet 2

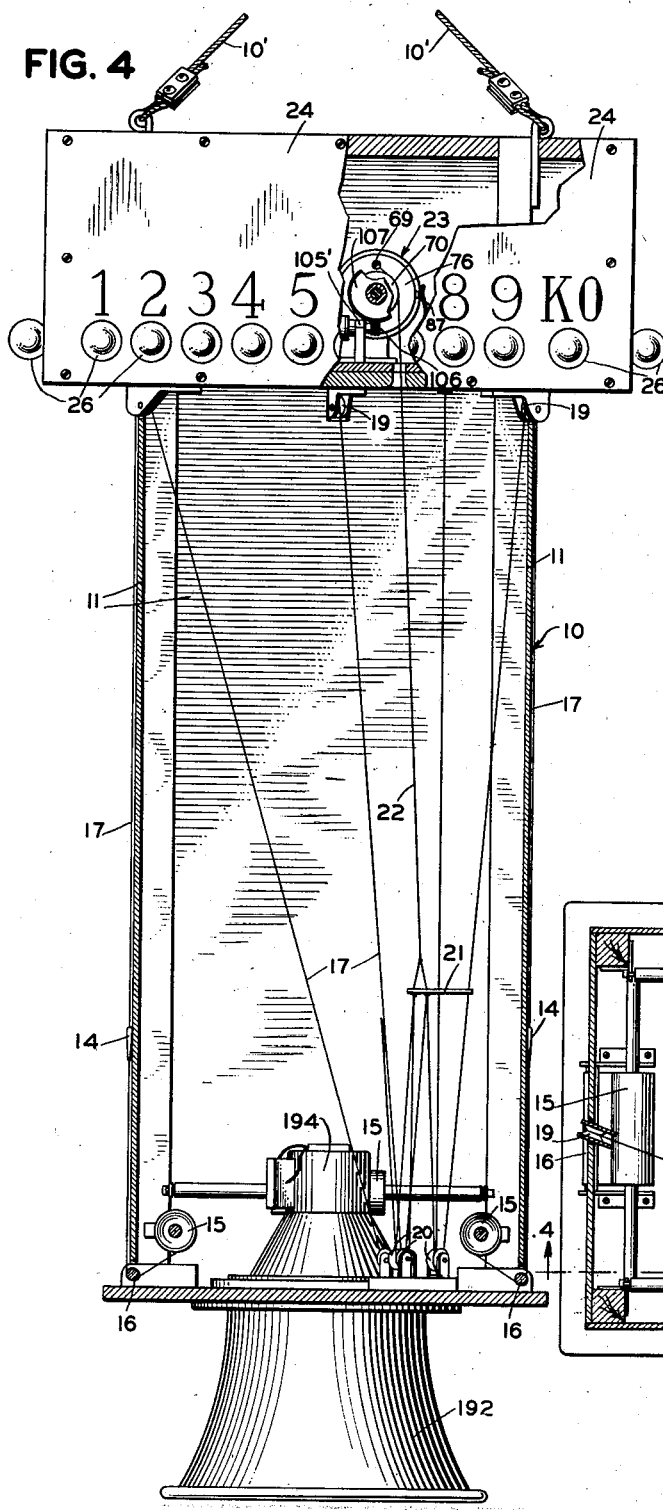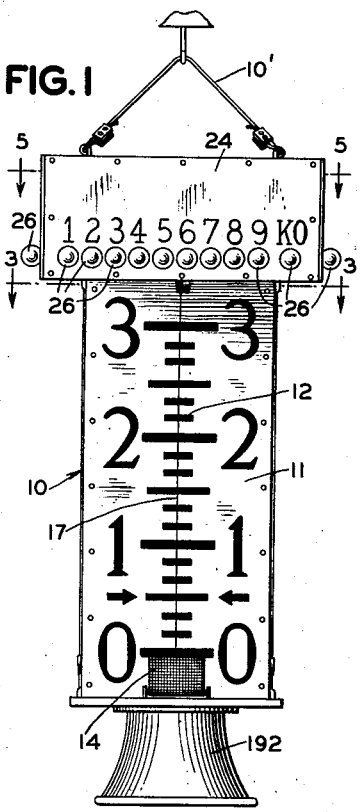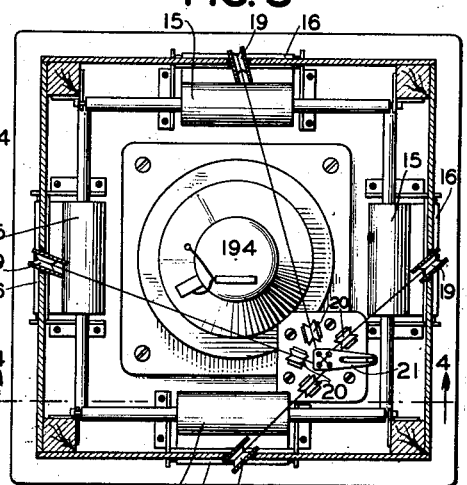

INVENTORS
R. STEENECK
R. F. DIRKES
R. B. WHITE
BY Eugene E. Brown
ATTORNEY

Aug. 20, 1940.  R. STEENECK ET AL  2,211,868
SPORT TIMING APPARATUS
Filed April 25, 1936   7 Sheets-Sheet 3
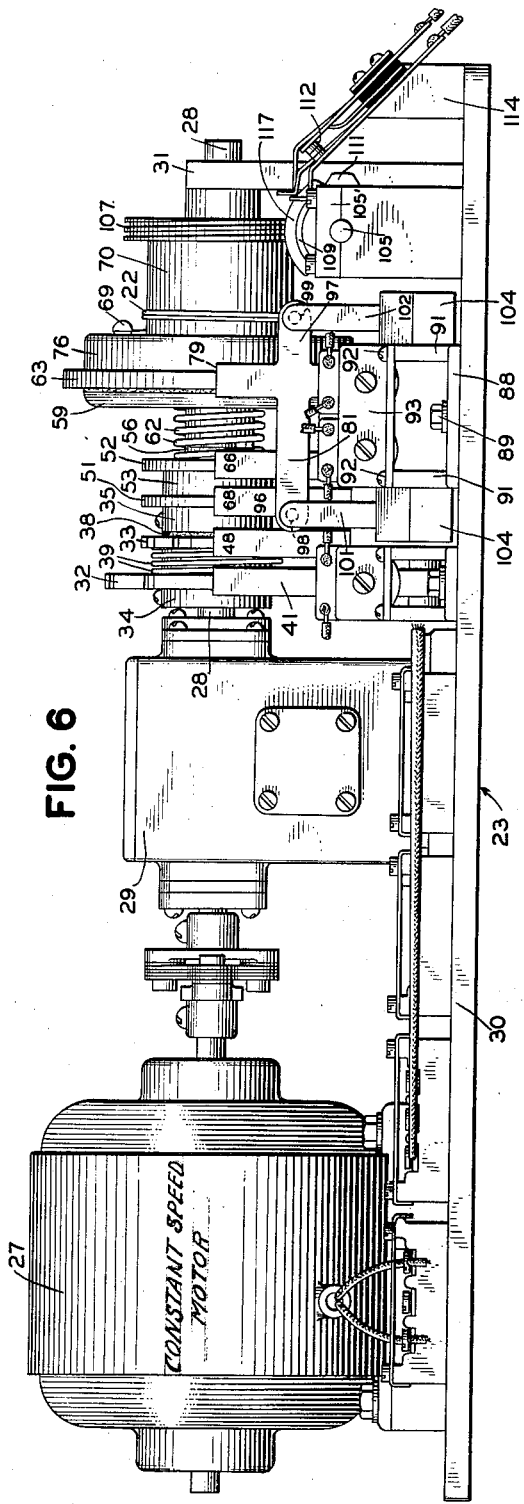
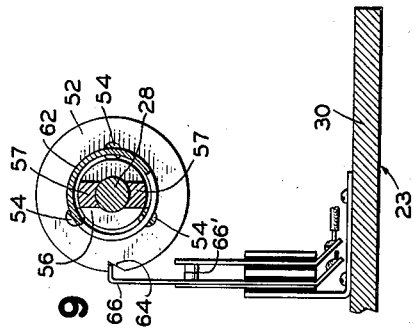
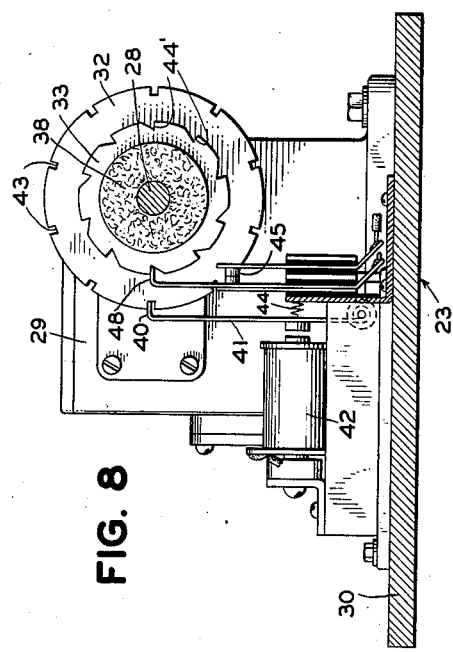
INVENTORS
R. STEENECK
R. F. DIRKES
R. B. WHITE
BY *Eugene C. Brown*
ATTORNEY

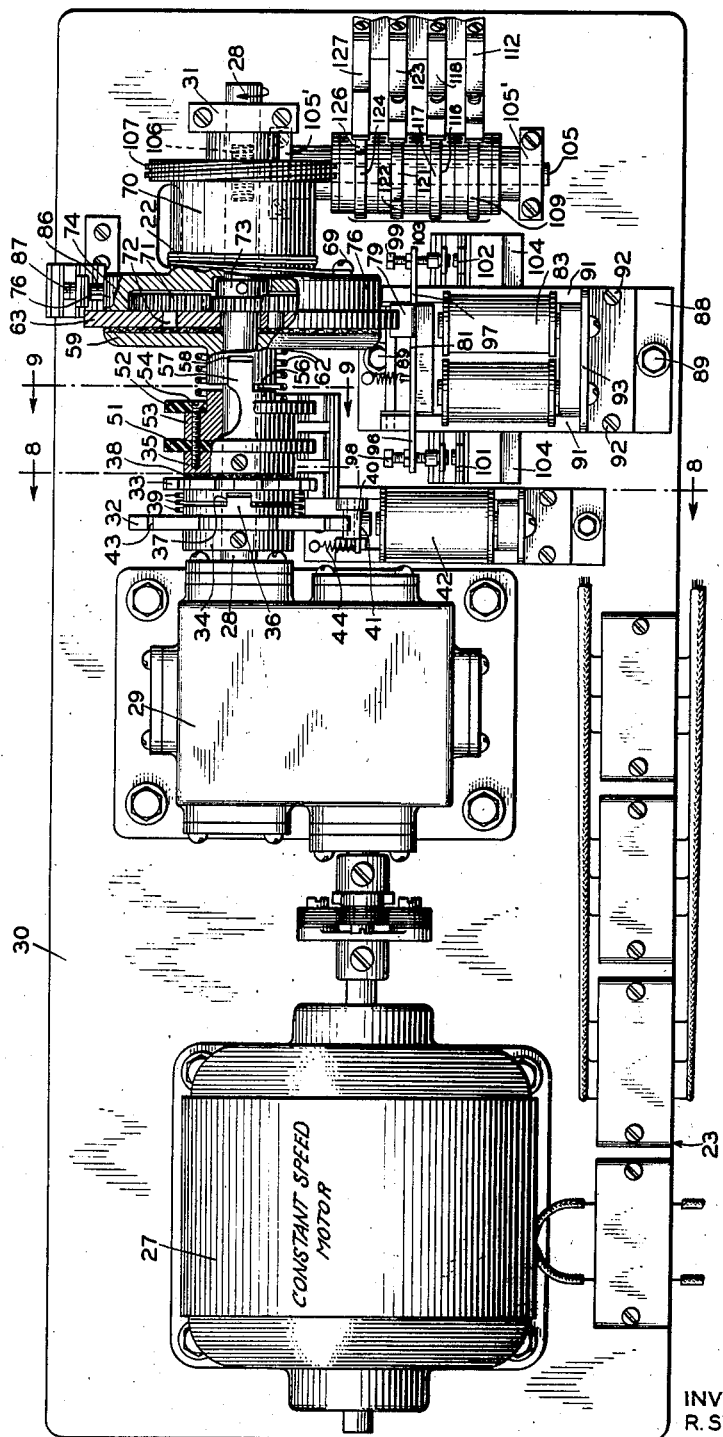

Aug. 20, 1940.   R. STEENECK ET AL   2,211,868
SPORT TIMING APPARATUS
Filed April 25, 1936   7 Sheets-Sheet 5

FIG. 10

INVENTORS
R. STEENECK
R. F. DIRKES
R. B. WHITE
BY Eugene C. Brown
ATTORNEY

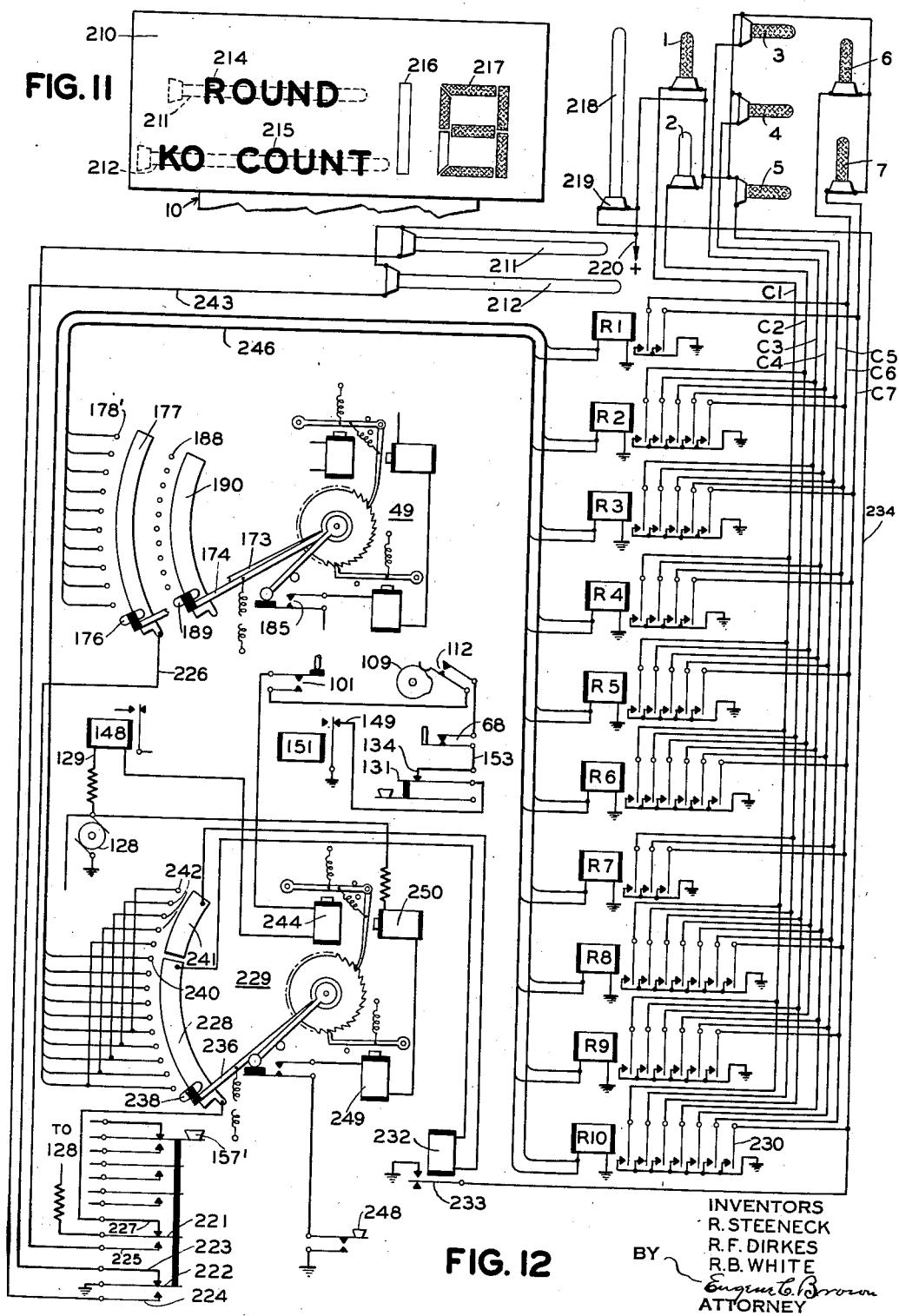

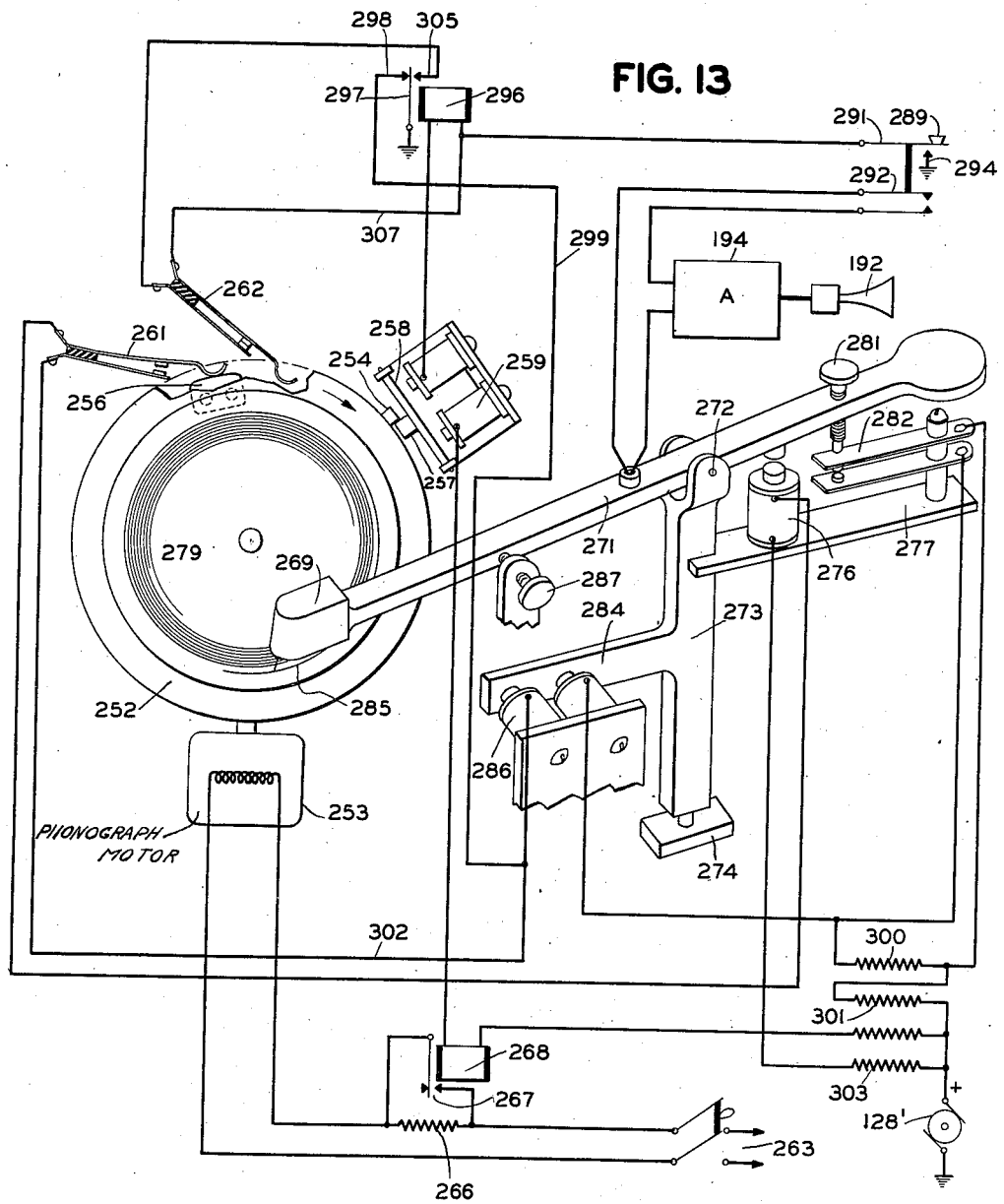

Patented Aug. 20, 1940

2,211,868

UNITED STATES PATENT OFFICE 2,211,868

SPORT TIMING APPARATUS

Robert Steeneck, New York, and Robert F. Dirkes, Jamaica, N. Y., and Roy B. White, Annandale, N. J., assignors to The Western Union Telegraph Company, New York, N. Y., a corporation of New York Application April 25, 1936, Serial No. 76,468

17 Claims. (Cl. 161—17)

This invention relates to timing apparatus primarily adapted to time a contest or an athletic event, such as a boxing match, in which there is an intervening rest period.

An important object of the invention is to provide timing apparatus including a large indicator or clock visible to an audience surrounding an arena, thereby enabling them to observe the timing of an athletic event or contest.

Prior to the invention to be disclosed herein, satisfactory apparatus has not been available for timing an athletic contest such as a boxing match in which there is an intervening rest period between rounds or periods of engagement. Both the rest periods and rounds must be accurately timed and the beginning and end of each period must be definitely made known by bells or other signals to the contestants and certain of the officials.

An object of the present invention is to accomplish this timing and/or signalling accurately, thus enabling officials to watch the progress of the match without having the attention of any distracted by the necessity for observing a stop watch.

Also, in a boxing match during the time allotted to a round when one contestant is down, the time in seconds that he is down must be measured.

Another object of the present invention is to provide means to indicate audibly and/or visually the lapse of each second of this time and the audible means in accordance with one phase of the invention announces by words the lapse of each second.

At the end of ten seconds, and provided that the ten seconds lapse during the time period of a round, the boxer remaining on his feet wins the match. In accordance with this invention at the end of the ten second period the timing apparatus is stopped and a distinctive signal is given. Heretofore, when a boxer has been knocked down near the end of a round, it has been difficult to determine accurately whether or not the time period allotted to the round has expired before the lapse of the ten second period. The present invention provides means for determining accurately and indicating to the spectators, officials and contestants whether or not the end of the round occurs before the expiration of the ten second period. This feature of the invention is believed to be entirely novel and its provision is an important object thereof.

Another object is to provide means to control timing apparatus for a boxing contest from some remote central point or points, such control embodying means for starting and stopping the apparatus if necessary, and also for setting the clock to a new position in preparation for the next contest.

Another object is to provide timing apparatus embodying a large, clearly visible indicator or indicators which make a complete timing movement in three minutes and a rest period timing movement in one minute. A related object is to provide means for giving a visible and/or audible signal ten seconds before the end of the rest period.

A further object is to automatically increase the timing indicator speed at the end of each round and to automatically operate a signal indicative of the termination of each round and rest period.

A still further object is to provide means for operating several indicators in unison from a single timing mechanism.

Still another object of the present invention is to provide means for giving an audible knockdown count in a boxing contest.

Still another object of the present invention is to provide means for indicating the progress of a boxing contest by indicating the round number.

Other and more specific objects of the invention defined by the terms of the appended claims will be apparent from the following description taken in connection with the accompanying drawings in which:

Fig. 1 is a view in front elevation of indicating apparatus embodying the present invention;

Fig. 3 is a sectional view in plan sectioned on line 3—3 of Fig. 1;

Fig. 4 is a side elevation partly in section taken on line 4—4 of Fig. 3;

Fig. 6 is a view in elevation of the timing mechanism of Fig. 5;

Fig. 7 is a top plan view partly in section of the mechanism shown in Fig. 6;

Figure 2:
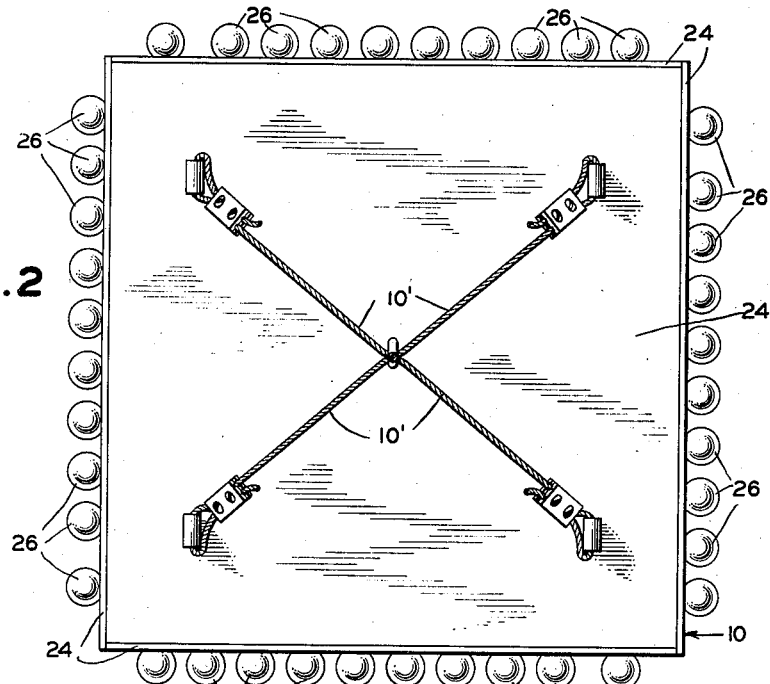
Fig. 2 is a top plan view of the apparatus of Fig. 1.

Figs. 8 and 9 are sectional views taken on lines 8—8 and 9—9, respectively, of Fig. 7, illustrating structural details; and Fig. 10 is a diagrammatic disclosure of the circuits and relationship of certain of the mechanical parts of the timing mechanism;

Fig. 11 is a fragmentary view in elevation of a modification including a visible annunciator and illuminated indicators;

Fig. 12 is a diagrammatic disclosure of the circuits for controlling the information displayed by the annunciator and indicators and includes a portion of the disclosure of Fig. 10; and Fig. 13 illustrates diagrammatically a further modification.

In the preferred form illustrated by Fig. 1 of the drawings the housing 10 of the timing indicator or clock is designed to present an indicating face 11 bearing indicia or graduations 12 when viewed from any position in an arena. In the embodiment shown the indicator presents four such faces so that the body thereof is rectangular in cross section. However, it will be understood that the housing 10 of the indicator may be hexagonal in cross section or have any convenient number of sides or indicating faces 11, or it may be circular in cross section with the indicia or graduations 12 completely encircling it. If the body of the indicator is cylindrical, as just stated, the movable indicating means to be described may be in the form of a vertically movable ring or sleeve. The housing 10 is preferably provided with suitable hanging means 10' as shown so that it may be suspended above an arena or ring.

The four indicating faces 11 of the clock are identical and the four longer lines of the graduations 12 thereon represent minutes and are numbered from 0 to 3 by bold numerals as shown. The minute spaces are further subdivided to show half minutes and ten second intervals. The minute graduations and their associated numerals are preferably painted a distinctive color.

Four movable indicators 14, one for each face 11, are arranged to cooperate with the indicia 12 and move up or down in unison. In the illustrative embodiment, each indicator 14 is a flexible strip of suitable material wound on a spring tensioned roller 15, and guided by a roller 16 situated adjacent the lower end of each face 11. A flexible cord or cable 17 attached to each indicator 14 is guided by and passes over upper pulleys 19 and lower pulleys 20. The cables 17 are joined at their ends by a member 21 to a single cable 22 which is operatively attached to the motor driven timing mechanism 23, the latter being mounted in a compartment 24 at the top of the housing 10. A stationary guide wire 25 passing through an elongated aperture 18 in the member 21 serves to keep the latter from twisting. The driving mechanism raises the indicators from the 0 line to the line marked 3 in three minutes, which corresponds to the standard length of a round in boxing matches, and lowers the indicators back to the 0 line in one minute, the latter period of time representing the standard rest period.

The walls of the compartment 24 provide a convenient place for the prominent mounting of a series of lights 26 which are numbered by prominently displayed numerals. If desired, the tenth light may be marked "KO" as shown to indicate a knockout. These lights, which indicate the elapsed time following a knock-down, are lighted in succession at one second intervals by means under control of the mechanism 23. The operating means for these lights and the manner in which the controls are to be manipulated will be fully described in connection with the discussion of the operation of the entire apparatus.

Figure 5:
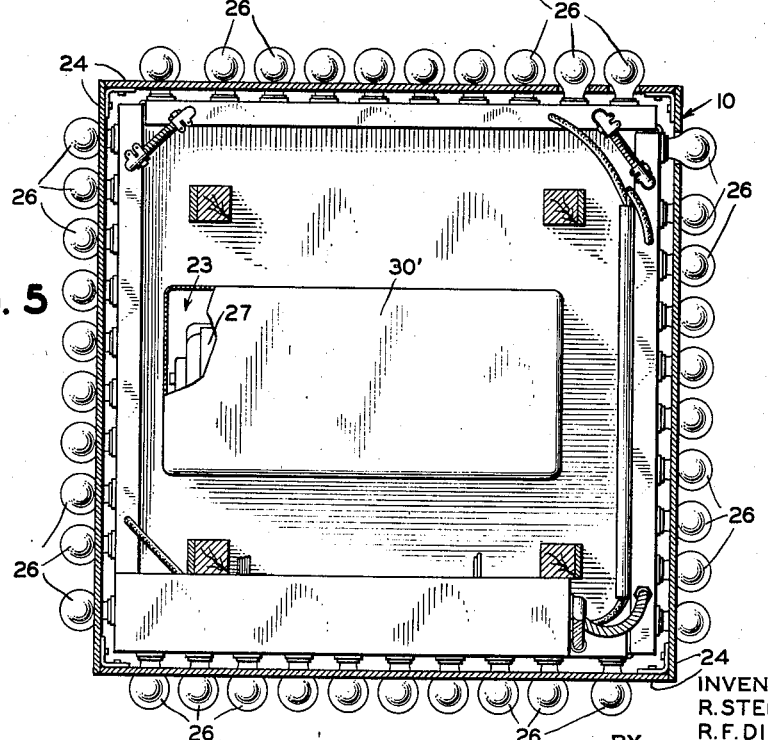
Fig. 5 is a plan view in section taken on line 5—5 of Fig. 1.

The operating mechanism 23, shown clearly by Figs. 6 and 7, is mounted on a base 30 and employs a constant speed motor 27, which may be either a synchronous motor driven from a frequency regulated alternating current supply or a governed motor held at a substantially constant speed by governing or speed control means known to the art. The motor 27 drives a shaft 28 clockwise as viewed from the right of Fig. 7 through a speed reducing mechanism 29, and in the particular embodiment shown, the ratio of the drive is chosen so that the speed of the shaft will be six revolutions per minute. A bearing 31 rotatably supports the shaft at its end remote from the mechanism 29. If desired, a cover 30' (Fig. 5) may be provided for protecting the mechanism 23.

A notched circular detent member 32 having ten equally spaced notches 43 and a contact operating cam 33 of insulating material are frictionally driven from the shaft 28 for controlling the knock-down count lights 26. The cam and detent member are rotatably journalled on the shaft 28 between two axially spaced collars 34, 35 which are secured to the shaft. One radial face of the member 32 frictionally engages the abutting face of the collar 34 and the hub of this member is provided with spline teeth 36 which engage in notches 37 in the hub of the member 33 to compel the members to rotate together. A friction disc or washer 38 of suitable material is interposed between the face of the cam member 33 and the adjacent face of the collar 35. A coiled spring 39 encircling the hubs of the members 32 and 33 forces these members apart so that they tend to be frictionally driven from the shaft 28 through the friction washer 38.

The detent member may be arrested and held in any one of ten angular positions by means of a latch 40 (Fig. 8) formed adjacent the end of the pivoted armature 41 of the magnet 42. The latch is biased toward the periphery of the detent member by a spring 44 when the magnet 42 is deenergized so that it will engage any one of the notches 43. The cam member 33 has 10 notches 44' formed on its periphery to close and open a set of spring pressed contacts 45 through a follower 48. Each of the notches 44 has a radial side or edge 44'' which causes the follower 48 to abruptly close the contacts 45. As shaft 28 turns six times in one minute, contacts 45 are abruptly closed at one second intervals when the magnet 42 is energized. The mechanism is arranged as shown in Fig. 7 so that the contacts 45 are closed when a notch 43 passes the end of the armature 41 or to express this in another way, rotation of the detent and cam members 32 and 33 is arrested only when the contacts 45 are closed. The contacts 45 control the stepping switch 49 (Fig. 10) which is similar to a "minor" switch employed in automatic telephone practice. The switch 49 and the circuits illustrated on Fig. 10 of the drawings for energizing the magnet 42 and for lighting the lights 26 in sequence by the switch 49 under control of the mechanically timed contacts 45 will be described in full detail hereinafter.

Axially spaced contact operating cams 51 and 52, preferably of insulating material, and a spacing collar 53 are secured together and to the collar 35 by screws 54, so as to rotate with the shaft 28. The hub 56 of the collar 53 is provided with spline teeth 57 which engage notches 58 formed in the hub of a friction clutch member 59 to drive the latter at the speed of the shaft 28 while permitting it to move axially. A coiled spring 62 urges the clutch member 59 into frictional driving engagement with the radial face of a pinion carrying disc 63. This disc is journalled on the shaft 28 so as to be rotatable independently thereof and forms part of the planetary gear system to be described presently.

The cam 52 is provided with a steep sided notch 64 which cooperates with a pair of contacts 66, as shown in Fig. 9 of the drawings, to permit these contacts to close once during each revolution of the shaft 28. Likewise, the cam 51 has a notch 67 which permits the contacts 68 to close at the same time as contacts 66 close. The contacts 68 are interposed in the circuit controlling the signals which give notice of the beginning and end of a round and the warning signal which precedes the beginning of a round, and the contacts 66 are interposed in the circuit controlling the lowering of the time indicator 14 during the rest period as will be described hereinafter.

The cable 24, previously mentioned as being operatively attached to the mechanism 23, is wound upon and unwound from a drum 70 as the latter is rotated counter-clockwise at 2 R. P. M. or clockwise at 6 R. P. M. (as viewed from the right of Fig. 7), by a planetary gear system which includes the above mentioned member 63 as an element. The free end of the cable is secured to the body of the drum by suitable means 69. It will be understood that the circumference of the drum is so chosen with respect to the distance between the zero and the three minute mark of the graduations 12 that as the drum rotates six times at the rate of 2 R. P. M., the indicator 14 moves upwardly over the graduations 12 to measure a three minute interval, and as the drum rotates in the opposite direction at the rate of 6 R. P. M., the indicator moves downwardly over the graduations to measure the one minute rest period. The directions of rotation of the drum at either speed may be opposite to that described and the indicator 14 may move downwardly to measure the three minute interval if desired.

Planet pinions 71 are carried on stub shafts 72 rotatably journalled in the pinion carrying disc 63. These pinions 71 are all in mesh with a gear 73 secured for rotation with the shaft 28 and are also in mesh with internal gear teeth 74 formed in the interior of a flange 76 of the drum 70. The drum 70 is loosely journalled on the shaft 28 and it will be seen that when the disc 63 is locked against rotation, gear 73 will rotate pinions 71 which in turn will drive the drum 70 by means of internal gear teeth 74 in a direction opposite to the direction of rotation of the shaft 28. The gear 73 has 24 teeth, and the internal gear has 72 teeth; therefore, the speed of drum 70 will be 2 R. P. M. when driving power is imparted to it from the gear 73 through the pinions 71.

A latch 79, formed by bending the upper end of pivoted armature member 81, is adapted to engage a notch 82 (shown diagrammatically by Fig. 10) in the pinion carrying disc 63 to hold the latter stationary to cause slow speed rotation of the drum 70 as explained above. An electromagnet 83 is adapted upon energization thereof to retract the armature member 81 and thus release the pinion carrier for rotation whereupon it is frictionally driven by the clutch member 59. To insure that magnet 83 will be energized only when the indicators 14 are at the major graduations such as minute and half minute marks, a contact operating stud 86 (Fig. 7) is provided on the periphery of the flange 76, the said stud engaging and closing a pair of normally open contacts 87 at each revolution of the drum 70. The contacts 87 are suitably supported by and insulated from the base 30. The electrical circuits interconnecting the contacts 66, 87 and the magnet 83 to accomplish the return of the indicators 14 from any of the half-minute indicators will be fully disclosed hereinafter.

Details of the support for the magnet 83 and its associated armature will now be described. A plate 88 (Fig. 6) secured to the base 30 by fastening means 89 has a pair of vertically disposed strips 91 secured thereto in a suitable manner as by screws 92. The frame of the magnet 83 is carried by an angle member 93 which may be conveniently secured in position on the strips 91 by the screws 92. The inner end of each strip 91 is apertured to receive the pintle 94 which pivotally supports the armature member 81. The said armature member has two horizontally extending ears 96 and 97 which carry adjustable contact operating studs 98 and 99 respectively. These studs cooperate with pairs of normally open spring contacts 101 and 102 to close the same when the latch 79 is retracted from the notch 82 in the disc 63 upon energization of the magnet 83. The contacts 101 are supported on a block of insulating material 103 secured to strip 91 and likewise contacts 102 are supported on a similar block 103 secured to the opposite strip 91. The purpose of the contacts just described and the circuits including these contacts will be described hereinafter.

To provide for proper sequential operation of the beginning and end of round signal, the preliminary warning signal and also the indicator reversing means, a series 104 (Fig. 7) of mechanically driven contact operating cams is mounted on a shaft 105 rotatably supported by bearing members 105'. This shaft carries a worm pinion 106 which is driven from the drum 70 by a worm 107 secured to or integral with the said drum. The gear reduction afforded by the worm and pinion is 1 to 9 so that the shaft 105 turns through two-thirds of a revolution during the time in which the drum 70 revolves six times in either direction. It will be seen, therefore, that the shaft 105 does not execute a complete turn but oscillates through two-thirds of a revolution.

A cam 109 for selecting a circuit to control operation of the preliminary warning signal has a contact operating portion 111 which cooperates with a pair of normally open contacts 112. These contacts are carried by a block of insulating material 114 mounted on the base 30. The operating portion 111 is so positioned that when the indicator 14 is approximately halfway between 0 and 1, the contacts 112 are closed. It will be apparent from the description of the operation which is to follow that the cam 109 maintains the contacts 112 closed at the time when contacts 68 are about to close. Contacts 68 determine the precise instant of closure of the control circuit including contacts 112 and 68.

The circuit which controls operation of the beginning and end of round signal is selected by a cam 116 which has a contact operating portion 117 adapted to close a pair of normally open contacts 118. These contacts, like contacts 112, are carried by the block of insulating material 114 previously mentioned. The cam 116 is secured upon the shaft 105 so that only each end of the contact operating portion 117 is effective to close the contacts 118 when indicators 14 are near the 0 and 3 divisions. This affords control of the circuit which operates the warning signal at the beginning and end of the round. As explained above in connection with contacts 112, the contacts 68 determine the precise instant of closure of the control circuit.

A cam 121 having a contact operating portion 122 cooperates with a pair of normally open contacts 123 and this cam is so located angularly on the shaft 105 that the associated contacts are closed only when the indicators 14 are adjacent the graduations marked 3. These contacts are in a circuit which controls reversal of the indicators 14 after they have completed their three minute cycle of operation. The control circuit which includes the contacts 123 is closed at the precise instant that the indicators reach the graduation marked 3 by the contacts 66.

To ensure that the armature 81 which releases the gear carrying disc 63 for rotation remains in its retracted position during the entire time when the indicators 14 are returning to the zero mark, a cam 124 provided with a contact operating portion 126 cooperates with a pair of normally closed contacts 127 in such a way that the contacts 127 are permitted to remain closed while the indicators 14 are returning from the graduation marked 3 to a point near the zero graduation. As the indicators approach the zero graduation, the cam 124 opens the contacts 127 which allows the armature 81 to be released whereupon the latch 79 will engage the notch 82 to arrest rotation of the disc 63 at the proper point.

The operation of the complete timing apparatus and the circuits and relays for controlling the cyclic operation of the indicators 14 and the several signals mentioned heretofore will now be described in full detail with reference to Fig. 10 of the drawings. Power for operating the relays and control magnets may be derived from any suitable source furnishing either alternating or direct current depending upon the construction and design of the relays and control magnets. In the illustrative embodiment, a source of direct current 128 is shown symbolically. The source 128 may be a generator, batteries or a rectifier and filter fed from any alternating current outlet. The last named arrangement is preferred. For convenience of illustration one terminal of either polarity of the source 128 is shown as being grounded and in the description which follows circuits are traced by referring to a ground connection. However, it will be understood that this ground may be a common insulated conductor. The remaining terminal of the source 128 is connected to the several circuits of the control apparatus through resistances 129. In order to explain the quick return feature of the indicators 14 in preparation for timing a new boxing contest, it will first be assumed that a previous contest has been ended before the completion of a round so that the indicators 14 are at some point between the 0 and 3 graduations, for example, just slightly beyond the two minute mark. The motor 27, as mentioned previously, is supplied from a suitable source of alternating current which may be connected to the motor by means of a switch 130 when it is desired to start the timing apparatus. Upon closing the switch 130 motor 27 begins to rotate at a constant speed imparting rotation to the shaft 28, and the indicators 14 move upwardly at slow speed by reason of engagement of armature 81 with the notch 82. Under conditions assumed it will be desirable to reverse movement of the indicators 14 without the necessity for allowing them to complete their upward travel and to this end means are provided for reversing the indicators at will. This is done under control of a manually operated key 131 which is provided with two front contacts 132 and 133 respectively. A pair of normally closed contacts 134 are also provided which are maintained in a closed position when the key is released. Upon depressing the key 131, ground is applied to the contact 132 and by way of a conductor 136 to previously mentioned normally open contacts 87. A conductor 137 which is connected to the contacts 87 is also connected to the contacts 66 and the current path for the magnet 83 continues from contacts 66 through the coils of magnet 83, the coil of a relay 139 and to the direct current source 128 over a conductor 142. The purpose of the relay 139 which has just been mentioned will be discussed hereinafter in connection with the description of the circuits for controlling the lamps 27. The magnet operating circuit just traced will be established upon closure of contacts 87 when these contacts are closed by the cam button 86 on the drum 76. As previously stated, this closure of contacts 87 occurs only when the indicators 14 are at minute or half minute graduations 12. When the armature 81 is attracted, the contacts 102 are closed which maintains excitation of the magnet 83 over a circuit including the contacts 102 and the normally closed cam operated contacts 127.

As the indicators 14 on their return movement approach the graduation midway between 0 and 1 it is desirable to stop further travel of the indicators 14 if the oncoming bout or contest is not to be performed immediately, thereby preventing premature operation of the preliminary signal. This may be conveniently done by a key or switch 143 which upon closure applies current to the operating coil of a relay 144, the latter having contacts 146 which open the circuit of the motor 27.

When a contest is about to start, the key 143 is opened, which permits contacts 146 to close, thus energizing the motor 27. Indicators 14 now resume their downward travel and at the instant they reach the mark halfway between 0 and 1, the warning signal is sounded to indicate that the contest is to be started within ten seconds. The preliminary warning signal, which may be a horn or any other suitable device, is connected in circuit with the contacts 147 of a relay 148. Relay 148 is energized at the proper time by a circuit which includes contacts 112, 101 and 68 and is traced as follows: Ground is applied by way of contacts 149 of a relay 151 which is de-energized at this time, conductor 152, contacts 134, conductor 153, contacts 68, contacts 112, contacts 101 operated by the armature 81, operating coil of relay 148 to the current source 129. Closure of the contacts 68 provides a means for completing the circuit just traced at the instant when the indicators 14 arrive at the graduation halfway between the 0 and 1. As the bell signal, which is operated at the beginning and end of each round, is also controlled by contact 68, it is necessary to prevent operation of the bell signal at this time. This is accomplished by interruption of the bell circuit by the contacts 118 which are maintained open at this time.

When the indicators 14 reach the 0 position the latch 79 comes into engagement with notch 82 of the pinion carrying disc 63, as explained above, whereupon direction of rotation of the drum is reversed and it rotates at a speed of 2 R. P. M. to move the indicators 14 over the scale 12 during a three minute period.

The signal which indicates the beginning and end of a contest or round is preferably a single stroke bell which is connected to the contacts 154 of a relay 156. The relay 156 is energized to ring the bell when ground is applied from contacts 149 of relay 151, conductors 152 and 153, contacts 68, contacts 118 and the operating coil of relay 156 which is in communication with source 128. The contacts 68 complete their circuit only when the indicators 14 have reached the 0 and 3 graduations, respectively.

The knockdown indicators 26, which may be in the form of a series of lights as previously explained, are controlled from a manually operable key 157 which is provided with two additional movable contacts or levers 158 and 159, the purpose of which will be later described. The front contact 161 of this key is connected by conductor 162 to the magnet 42. The remaining terminal of this magnet is connected to the direct current source 129. When key 157 is closed, it will be seen that the magnet 42 will be energized to retract the latch 41 so as to permit the contact operating cam 33 to be frictionally driven from the shaft 28. The back contact 163 of the key 157 is connected to the operating coil of a relay 166 so that during the time the key 157 is in its normal position, ground is applied to the said relay coil 166 over a circuit which includes contacts 149 of relay 151 and the front contact 140 of relay 139. When the key 157 is depressed to energize the magnet 42, the operating coil circuit of relay 166 established through the key 157 is broken; however, the operating coil of relay 168 is kept energized through back contact 165 until contacts 45 open. This feature prevents stepping of the minor switch until the contacts 45 close one second later. When the contacts 45 open, the back contact 168 of the relay 166 is closed which completes the circuit including contacts 45 and the operating coil of the previously mentioned minor switch 49. As the contacts 45 close once each second, a ratchet 171 is stepped in a clockwise direction by the operating pawl 172.

The minor switch 49 comprises two insulated contact arms 173 and 174. The arm 173 carries a contact brush 176 which is in contact with a segment 177 and a series of ten contacts 178. The segment 177 is connected to a suitable source of current indicated at 180 and the contacts 178 are each connected to one of the series of lamps 26. It will, therefore, be seen that upon each pulse received by coil 169 under control of the contacts 45, the switch arm 173 will be moved one step, causing the lights 26 to be illuminated in succession.

If at any time it is desired to stop operation of this minor switch 49, as for example when a boxer stands up, it is only necessary to release key switch 157. This interrupts the circuit through the latch coil 42 and restores the circuit through the back contact 163 which reenergizes the operating coil 164 of the relay 166.

The minor switch 49 is reset to its 0 or starting point by means of serially connected reset magnets 179 and 183 which upon energization, retract a latching pawl 181 and driving pawl 172 from the teeth of the ratchet 171. Ground is applied to the reset magnets 179 and 183 from the back contact 163 of the switch 157. A pair of contacts 185 are included in circuit with the release magnet 179 to open the said circuit when the minor switch reaches its 0 position. This is accomplished mechanically by an arm 186 which opens the contacts 185.

If a boxer remains down during the full ten seconds, all of the lamps numbered 1 to 9 are illuminated in succession and the tenth lamp is also illuminated when the ten seconds have elapsed. When this occurs it is desirable to stop operation of the indicators 14 so as to show the exact time during the bout when the knock-out occurred. This is accomplished by the contact 188 which is engaged by a brush 189 secured to the switch arm 174. The brush 189 is in engagement with a grounded segment 190 and in the tenth position of switch 49 comes in contact with the contact 188 to apply ground to the operating coil of relay 151 and the operating coil of the relay 144, both of these coils being in series. Upon energization of relay 144, its contacts 146 are opened and the motor 27 is stopped. The contacts 149 of the relay 151 are opened, which removes ground from the signal contacts 68 to prevent operation of the bell. Ground is also removed from the contact 163 of the key 157 preventing energization of the reset coil 179 of the minor switch when the key is released.

The relay 139 which as previously mentioned is in series with the magnet coil 83, is energized during the time that the indicators 14 are returning toward the 0 position. The operation of the relay 139 causes the minor switch 49 to be reset as ground is applied to magnet 179 from the front contact 140 of this relay. The front contact 140' of the relay 139 also applies ground to the operating coil 164 of the relay 166. Progression of the minor switch 49 is thus arrested automatically in the event that the indicators 14 reach the three minute position before the minor switch has completed its cycle of operation since when this occurs magnet 83 and relay 139 are energized simultaneously, energization of the latter preventing operation and resetting of the minor switch 49. As previously stated, this is an important feature of the present invention as sounding of the bell clearly shows that the round is ended before the knock-out period of ten seconds expires.

The relay 151 which is in circuit with the contact 188 makes the warning bell signal inoperative so that if the minor switch reaches its tenth position before the three minutes allotted to the round have elapsed, it is impossible for the bell signal to sound, thus eliminating any possibility of confusion.

To facilitate transportation of the apparatus and to make it more convenient for use, the keys 157, 131 and 143 are preferably mounted on a stand or cabinet which may be placed at some point affording a clear view of the arena.

In some instances it may be desirable to provide an audible means for counting off the seconds during which a fighter is down. To this end I have disclosed a loud speaker 192 conveniently mounted on the lower end of the housing 10 and which is connected to a phonograph pickup 193 through a suitable amplifier 194. The pickup 193 rests upon a record carried by a phonograph turntable 196 driven from a speed controlled or synchronous motor shown symbolically at 197. The record which is provided for this purpose is preferably one which will reproduce counting from 1 to 10. The speed of the motor and/or the intervals between the recorded numbers on the record are so selected that one second elapses between the reproduction of each number by the loud speaker 192. The phonograph motor and the amplifier are energized upon depression of the key 157 through the previously mentioned switch arms 158 and 159 which cooperate with the contacts 199 and 201 respectively.

Figs. 11 and 12 of the drawings disclose a modified embodiment of the invention employing an alternative knockout counting indicator and including in combination additional apparatus for displaying the number of the round. The timing mechanism and apparatus for controlling the preliminary and bell signals is the same as that already described in detail in connection with Fig. 10 of the drawings and therefore in the description of the apparatus of Figs. 11 and 12 which is to follow only parts which differ from those previously described will receive detailed mention.

The body 10 of the indicator or clock is similar to that previously described and the top thereof forming the housing 24 provides modified indicating faces 210 which are visible from all sides of an arena. Lamps 211 and 212 are provided which are adapted to illuminate signs 214 and 215 preferably in the form of transparent letters forming the words "Round" and "Count" respectively. The visible annunciator for both the round number and the knockout count in seconds is composed of monograms 216 and 217. Lamps are provided for illuminating selected parts of one monogram or the lamps themselves may be exposed in such a manner as to form characters to be displayed. It will be understood that any desired combination of digits for any purpose may be displayed in accordance with the invention by providing a required number of monograms 217.

Referring to Fig. 12, we have shown the monogram 217 as composed of seven lamps numbered 1 to 7 and arranged to display the numeral 8 in block outline when all are illuminated. The monogram 216 in the embodiment shown displays the numeral one and may comprise a single lamp 218 as shown, or if desired, a number of separate lamps disposed in alignment. Each lamp of both monograms is mounted in a suitable socket device 219 secured on or adjacent the walls of the housing 27. If desired, a troughlike reflector for each lamp may be provided to project the light flux forwardly through the face 210 of the display sign. A conductor 220 in communication with a suitable current source, for example, the source 128, is connected to one terminal of all the lamps.

The formation of digits is effected by applying current to the particular lamps comprising the character to be displayed. Reference will now be had to Fig. 12 for a description of one manner of controlling the application of current to the lamps. The control of lamps 211 and 212 is effected by a key 157' which performs the functions of the key 157 of Fig. 10 but is equipped with additional movable contact arms 221 and 222. The arm 222, which controls illumination of the lamps 211 and 212, is grounded and cooperates with a back contact 223 and a front contact 224 so that when the key 157' is in its normal position shown, ground is applied to the contact 223 illuminating the "round" sign. Upon depression of the key 157' when a knockdown occurs, the circuit supplying current to lamp 212 is completed through the contact 224. It will therefore be seen that as the contest proceeds, the "round" sign will be continuously illuminated until the key 157' is depressed when a knockdown occurs, at which time the "knockout count" sign is illuminated by the lamp 212. The arm 221 of the key 157' is connected to the current source 128 and a front contact 225 adapted to cooperate with said arm is connected to the segment 177 of the minor switch 49 over the conductor 226. A back contact 227 normally in engagement with the arm 221 connects with a segment 228 of an additional minor switch 229, the latter serving at times to control illumination of the monograms 216 and 217 to display the number of the round. The minor switch 229 is similar in construction to the minor switch 49 already described in detail in connection with Fig. 10 and also shown on Fig. 11.

The seven lamps 1 to 7 of the monogram 217 and the lamp 218 are controlled by a bank of relays numbered R1 to R10. Each of these relays is provided with a plurality of movable contact tongues and stationary contacts so that when a given relay is energized, certain of the lamps will be illuminated to form the digit which it is desired to display. In the embodiment disclosed by Figs. 11 and 12, a terminal of each of the lamps 1 to 7 is connected to one of the conductors numbered C1 to C7 in the order named and these conductors are connected to the contact tongues of the several relays in such a manner that, for example, the tongues of relay R1 apply ground to conductors C6 and C7 when the said relay is energized, thereby illuminating lamps 6 and 7 to display the numeral 1. If, however, relay R9 is energized, its six operating contacts will be closed, applying ground to conductors C1 and C3 to C7, illuminating lamps 1 and 3 to 7 to display the numeral 9. This display is indicated on Figs. 11 and 12 of the drawings. However, it will be understood that to produce this display automatically in a manner to be described, key 157' will be depressed and the minor switch 229 will have advanced beyond its illustrated position. In a like manner any of the lamps 1 to 7 may be illuminated to display a desired character. A display of the numeral 10 is accomplished by lighting the lamp 218 forming the numeral 1 represented by reference character 218. This is accomplished in one instance by an additional tongue 230 on the relay R10 which is connected to a wire 234, the latter being in communication with one terminal of the lamp 218. To display the numerals 11 and up a relay 232 is provided, the movable contact 229 of which applies ground to the conductor 234. The manner in which the relay 232 is energized will be pointed out hereinafter.

From the foregoing it will be seen that the novel display system of the invention is such that any arrangement may be provided to energize the relays R1 to R10 in succession and that any number of banks of relays may be provided to accompany any number of monograms 217 whereby any combination of figures may be displayed. Also, relay 232 may be energized in any suitable manner simultaneously with any one of relays R1 to R9. For the specific purpose of round counting in a boxing match, the previously mentioned minor switch 229 is employed to control successive energization of the relays R1 to R10 and the tens relay 232.

The minor switch 229 has a single switch arm 236 provided with a contact brush 238 adapted to cooperate with a series of ten contacts, the tenth being indicated by a reference character 240, and an auxiliary segment 241. Five additional contacts 242 are provided which are connected in order to the first five contacts of the series of contacts 240. The contacts 240 are connected by a cable 243 to relays R1 to R10, the first contact of the series 240 being connected to relay R1 and the remainder of the contacts being connected to the relays in order. The previously mentioned relay 232 is connected in series between the segments 228 and 241 so that as the brush arm 236 is advanced beyond the end of segment 228, energizing current for relays R1 to R5 inclusive will traverse the operating coil of the relay 232, causing its contacts 233 to be closed, thus applying ground to the terminal of lamp 218 by way of the conductor 234. By this simple and effective arrangement the numerals 11 to 15 will be displayed following display of the numeral 10. The brush arm 236 is stepped in a clockwise direction upon energization of the minor switch operating magnet 244, the said magnet being included in the circuit which operates the preliminary warning signal. This circuit described in connection with Fig. 10 is reproduced in detail on Fig. 11 and includes contacts 68 and contacts 112. As each round is about to begin, the warning signal is sounded, as previously explained, and the brush arm 236 is advanced one step to display the number of the oncoming round.

Timing of the knockdown indication is controlled as explained in connection with Fig. 10 by the contacts 45 which energize the stepping magnet 169 through the contacts of the pulse timing relay 166. The series of ten contacts 178' of the minor switch 49 are connected by a cable 246, shown for convenience as a duplicate of the cable 243, to the relays R1 to R10 in the same manner as contacts 240 are connected to these relays. As the key 157' is depressed upon occurrence of a knockdown, the circuit completed at the back contact 223 is broken, causing the lamp 211 to be extinguished and the circuit for illuminating lamp 212 is completed by way of contact 224. The circuit to the segment 228 of the minor switch 229 is broken at the back contact 227 and the circuit including the wire 226 and contact segment 177 of the minor switch 49 is completed at contact 225, thus transferring control of the illumination of monograms 216 and 217 from the minor switch 229 to the minor switch 49. At the same time the contacts of the key 157' which are like those of key 157 place the turntable 196 and the amplifier 194 in operation to give an audible count coinciding with the display of numbers by the monograms.

To reset the minor switch 229 to zero a separate reset button 248 is connected in circuit with the reset magnets 249 and 250. Upon energization of these two magnets, the pawls in engagement with teeth of the arm driving ratchet are withdrawn in the manner already described in connection with magnets 179 and 183.

It is believed that operation of the apparatus disclosed in Fig. 11 will be apparent from the foregoing; however, its use in timing a boxing contest will be set forth to aid in a complete understanding of the invention. When the preliminary warning signal sounds in advance of the beginning of the first round of the contest, the contact arm 236 of the minor switch 229 is advanced one step energizing relay R1 to illuminate lamps 6 and 7 over conductors C1 and C2. Upon each successive sounding of the warning signal, contact arm 236 is advanced one step by the magnet 244. When the preliminary warning signal is sounded in preparation for the eleventh round, contact brush 238 engages the eleventh contact which is the first contact of the series 242, whereupon the tens relay 232 is energized to illuminate the lamp 218 displaying the numeral to indicate that round 11 is about to begin.

If at any time one of the contestants is knocked down, the official in charge of the apparatus will immediately depress key 157' which as previously stated, disconnects contact segment 228 and transfers the connection to the segment 177 of minor switch 49. Operating coil 169 is energized at one second intervals as previously explained in connection with Fig. 10 advancing the contact arm 173 over the series of contacts 178' to energize magnets R1 to R10 at one second intervals. When the contestant rises to his feet following a knockdown, key 157' is released, resetting minor switch 49 and again energizing the contact segment 228. The lamp 212 is extinguished and lamp 211 is again lighted and the proper round number is displayed in accordance with the position of the switch arm 236. If the contestant remains out of the contest after a lapse of ten seconds, the timing apparatus is stopped as explained previously; however, the numeral 10 disappears when the key is released and the round number last displayed reappears.

Fig. 13 of the drawings discloses a preferred modification of apparatus in accordance with the invention for providing the audible count in unison with the lamps 26 of Fig. 1 or the indication displayed by the monograms 216 and 217 of Fig. 11. The loud speaker 192 and the amplifier 194 may be identical with those employed in the apparatus disclosed by Fig. 10. A turntable 252 driven by a motor 253, the latter being of a constant speed or speed governed type, is provided with a stop member 254 and a contact operating projection 256 preferably located in different horizontal planes. The stop or detent 254 is adapted for engagement by a stop 257 secured to an armature 258, the latter upon attraction by a magnet 259 serving to withdraw 257 from engagement with 254, permitting the turntable to rotate. A pair of normally closed contacts 261 and 262 are positioned in the path of the contact operating member 256 and are opened momentarily upon passage of the member 256 as the turntable rotates. The motor 253 is energized from a suitable source of current 263 and in the event that said motor is of the constant speed alternating current type, operating current will be derived from an alternating current source. A resistance 266 inserted in series with the motor is adapted to be short-circuited at times by contacts 267 of a relay 268. The circuits controlling energization of said relay will be described hereinafter.

A reproducing device or pickup 269 is carried by an arm 271 pivotally connected at 272 to a support 273 so as to swing in a vertical plane. The support 273 is mounted upon a suitable bearing, for example the pivot 274, permitting it to swing about a vertical axis. A magnet 276 carried by a horizontal support 277 integral with or secured to the support 273, serves upon energization to swing the arm 271 vertically, thus raising the reproducer 269 from operative engagement with the surface of a record 279 carried by the turntable 252. The arm 271 is provided with an adjustable contact operating stud 281 which cooperates with a pair of normally open contacts 282 to close the same when the reproducing device 269 is raised from the record. A magnet armature 284 integral with or secured to the support 273 is positioned in the field of an electromagnet 286 so that upon energization of this magnet the armature 284 is attracted, causing the support 273 to swing about its vertical axis and return the arm 271 into engagement with an adjustable stop 287. It is desired to point out that the record 279 preferably is provided with a spiral groove 285 laid out in a novel manner so that the initial turn or turns of the record will move the arm 271 through a larger angle than the angle through which it will move as the reproducer traverses the continuation of the groove 285 carrying the sound recording. This wide spacing at the start reduces the possibility of picking up the wrong groove when resetting arm 271 to its initial position and also prevents damage to adjacent grooves by the dropping of the pickup arm 271 upon the record in restoring arm 271 to its initial position.

The phonograph is placed in operation by a key 289 which comprises contact arms 291 and 292, the last named contact arm being identical in function with the contact arm 159 of key 157 disclosed in Fig. 10. The contact arm 291 when depressed cooperates with a grounded contact 294 to complete a circuit from a suitable current source 128' to ground through the operating coil of a relay 296, the electromagnet 259 and the operating coil of the relay 268. The contact tongue 297 of the relay 296, when the latter is deenergized cooperates with a back contact 298 completing a circuit over a conductor 299 including the magnets 286 and the resistance 300 in series. Energization of the magnet 286 in this manner insures that in the position of parts shown in Fig. 13, the arm 271 will be maintained against the stop 287, thus eliminating a possible source of error in the count when the key 289 is depressed. An additional resistance 301 may be included in the circuit if desirable or necessary.

The conductor 299 is branched as indicated by numeral 302, the said branch including in series the contacts 261 and the electromagnet 276, the latter having one terminal connected to the source 128 through a resistance 301 if desired. The relay 296 is also provided with a front contact 205, which connects with one of the contacts 262. The remaining one of the contacts 262 is connected by a conductor 307 to any point of the conductor which interconnects the key arm 291 and one terminal of the relay 296 providing a locking circuit for the relay which is effective in a manner to be described hereinafter.

With the parts as shown in Fig. 13, the motor 253 will be energized through the resistance 266, causing it to exert less than normal torque thereby holding the stop 254 against the stop 257. The reproducer 269 will be in engagement with the beginning of the groove 285 on the record 279. The key 289 will be in its normal or raised position, and the contact 292 will be out of engagement with its cooperating contact thereby disconnecting the amplifier and loudspeaker from the reproducing device 269. Magnets 259, 286, and the operating coil of relay 296 will be deenergized inasmuch as the circuit including these devices will be broken at the contact 294.

When, during the course of a boxing contest, a knockdown occurs the key 289 is depressed which connects the amplifier and loud speaker to the reproducing device 269 by means of the contact arm 292 and energizes by means of the arm 291 the operating coil of the relay 296, magnet 259 and the operating coil of relay 268. The armature 258 will be retracted, withdrawing the member 257 out of engagement with the stop member 254 to permit the turntable 252 to rotate in a clockwise direction as viewed from above. The resistance 266 will be short-circuited at the contacts 267 of the relay 268 now energized, causing the motor to exert its full torque to bring the turntable to reproducing speed which occurs almost immediately inasmuch as the said motor is constantly energized. The circuit including the contact 298 is opened since relay 296 is energized, resulting in deenergization of the magnet 286 which permits the reproducer 269 to follow the record groove 289 without restraint. The arm 271 swings rapidly away from the stop 287 because of the wide pitch of the initial portion of the groove 285. As rotation of the record continues, the loud speaker 192 will announce at one second intervals the numbers from one to ten.

Assuming that the count is to be stopped before a lapse of ten seconds, key 291 is released, which disconnects the amplifier from the reproducing device 269 and opens contacts 291 and 294. However, the relay 296 will still be energized by ground applied from its front contact through contacts 262. The contact operating projection 256 and the stop 254 are so arranged angularly with respect to each other about the turntable 252 that following opening of the contacts 262, the turntable will make substantially one full revolution before it is arrested by the stop 257. When next the contact operating projection encounters contacts 262 following opening of the key 289, relay 296 will be deenergized along with magnet 259 and the relay 268. Following this the turntable will make substantially one revolution and be caught by the stop 257 which will be accomplished with slight shock as the resistance 266 will be in series with the motor reducing its torque. Upon deenergization of the relay 296 in the manner just stated, a circuit is completed over the conductor 302 from the contact tongue 297 and back contact 298 which includes the contacts 261 and the magnet 276. The magnet 276 now being energized raises the reproducing device 269 from operative engagement with the surface of the record. Also, the magnet 286 will be energized at full strength over the conductor 299 since the resistance 301 will be short-circuited upon closing of contacts 282 as the arm 271 tilts in response to the pull of the magnet 276. The arm 271 will be drawn back against the stop 287 and when the turntable completes its revolution following opening of the contacts 262 and is arrested by the stop 257, the contacts 261 will be opened and retained in the open position by the contact operating projection 256. Opening of the contacts 261 deenergizes the magnet 276 and allows the reproducer 269 to again engage the record at the beginning of the groove 285 in readiness for the next audible count. Contacts 282 will open inserting resistance 201 in series with the magnet 286.

From the foregoing complete description of illustrative embodiments and their operation, it will be seen that accurate and reliable timing of a boxing contest or like sporting event is provided by the present invention.

While the invention has been explained and described in detail in connection with a number of illustrative embodiments thereof, it is to be understood that the invention may be embodied in other forms and, therefore, the invention is not limited except as indicated by the terms and scope of the appended claims.

We claim:

1. In game timing apparatus for measuring successive time intervals, a movable time measuring indicator, means for moving said indicator at a predetermined time measuring speed during one time interval of definite duration and means for moving said indicator at a different time measuring speed during a succeeding time interval of definite duration.

2. In game timing apparatus for measuring successive time intervals, a movable time measuring indicator, means for moving said indicator at a predetermined time measuring speed in one direction during one time interval of definite duration and means for moving said indicator at a different time measuring speed in the opposite direction during a succeeding time interval of definite duration.

3. In game timing apparatus for measuring successive time intervals having a scale divided to represent one minute intervals, a movable time measuring indicator, means for moving said indicator in one direction over said scale during one time interval of three minutes duration, and means for moving said indicator in the opposite direction during a succeeding time interval of one minute duration.

4. In game timing apparatus for measuring successive time intervals having a scale divided to represent one minute intervals, a movable time measuring indicator comprising a flexible member movable over said scale, means for moving said indicator in one direction over said scale during one time interval of three minutes duration, and means for moving said indicator in the opposite direction during a succeeding time interval of one minute duration.

5. In game timing apparatus for measuring successive time intervals, an exposed indicating face provided with graduations, an indicator in the form of a strip of material adapted to move over said face to conceal said graduations from view to indicate lapsed time, and timing mechanism operatively connected to said indicator to draw the same over said indicating face.

6. In game timing apparatus for measuring successive time intervals, an exposed indicating face provided with graduations representing three one minute intervals, an indicator in the form of a strip of flexible material secured at one end to a winding roll, means tending to cause said strip to be wound on said roll, the free end of said strip adapted for movement over said face in cooperation with said graduations to indicate the lapse of a three minute period and timing mechanism operatively connected to said indicator to draw the same over said indicating face at a uniform rate during said three minute period.

7. A timing clock for an arena comprising a body portion having a plurality of faces disposed so that said clock is visible to an audience surrounding an arena, graduations on each of said faces, timing mechanism for said clock, indicators movable longitudinally to conceal said graduations from view, one for each of said faces, and means operatively connecting said indicators to said timing mechanism.

8. A timing clock for a boxing contest comprising a body portion having a plurality of faces disposed so that the clock is visible to an audience surrounding an arena surmounted by an enlarged housing, indicators on the enclosing walls of said housing for displaying indications representing the progress of a boxing contest, graduations on each of said exposed faces, timing mechanism for said clock within said housing, longitudinally movable indicators, one for each of said faces, and means operatively connecting said longitudinally movable indicators to said timing mechanism.

9. In combination with timing mechanism including means for measuring seconds, means for stopping the timing mechanism upon operation of said seconds measuring means continuously for ten seconds and manually operable means for initiating operation of said first named means, electric circuits and signalling devices controlled by said circuits, contacts in said circuits, and means controlled by said manually operable means movable by the timing mechanism for operating said contacts whereby signals are produced upon operation of said manually operable means.

10. In combination with timing mechanism, a visible indicator, means whereby said timing mechanism imparts movement to said visible indicator, means for arbitrarily stopping and starting the timing mechanism and self operating means controlled from said timing mechanism for periodically reversing the direction of movement of said indicator, electric circuits and signalling devices controlled by said circuits, contacts in said circuits, and means movable by the timing mechanism for operating said contacts whereby signals are produced upon reversal of said indicator.

11. In combination with timing mechanism, a visible indicator, means whereby said timing mechanism imparts movement to said visible indicator, self operating means controlled from said timing mechanism for periodically changing the speed of operation of said first named means, electric circuits and signalling devices controlled by said circuits, contacts in said circuits, and means movable by the timing mechanism for operating said contacts whereby signals are produced at the beginning and end of predetermined periods and whereby another signal is produced at an intermediate point of time.

12. In combination with timing mechanism including means for measuring seconds, a counting device actuated from said means, a manually operable control for initiating operation of said counting device, electric circuits and a signalling device, controlled by said circuits, contacts in said circuits, and means movable by the timing mechansm for operating said contacts whereby said signalling device is operated at the beginning and end of predetermined periods and means responsive to said counting device to prevent operation of said signalling device upon completion of actuation of said counting device for ten consecutive seconds.

13. In timing apparatus for a boxing contest, a timing mechanism having a time indicator operating at a given time measuring speed for measuring three minute contest periods, and at a different time measuring speed to measure one minute rest periods between the contest periods, and a motor operating at a substantially constant speed operatively connected to drive said timing mechanism, an audible signal, and means controlled by said timing mechanism to operate said signal at the beginning and end of the three minute time intervals whereby to announce the periods measured by the timing mechanism.

14. In timing apparatus for a boxing contest, a timing mechanism having a time indicator operating at a given time measuring speed for measuring three minute contest periods, and at a different time measuring speed to measure one minute rest periods between the contest periods, and a motor operating at a substantially constant speed operatively connected to drive said timing mechanism, an audible signal, and means controlled by said timing mechanism to operate said signal in advance of each three minute time interval whereby to give a warning signal before the start of the three minute period.

15. In combination with timing mechanism including means for measuring seconds, a counting device and means interconnecting said measuring means and said counting device to operate the latter, a control device for said interconnecting means adapted for manual operation, means whereby said control device controls operation of said counting device from said measuring means and means to stop said timing mechanism upon operation of said counting device for ten consecutive seconds.

16. In combination with timing mechanism for timing a boxing contest including means for measuring seconds, a counting device actuated from said means, a manually operable control for initiating operation of said counting device, a "round" sign and a "ko count" sign, electric circuits and contacts in said circuits for controlling said signs and means associated with said manually operable control for opening the contacts of said "round" sign and closing the contacts of said "ko count" sign when said control is operated to initiate operation of said counting device.

17. In combination with timing mechanism including means for measuring seconds, a counting indicator for indicating seconds, means for operatively interconnecting said measuring means and said indicator when a seconds count is desired, an audible counting device for speaking numerals in succession at one second intervals, independent means for driving said audible counting device in synchronism with said means for measuring seconds, a manually operable control device for said audibly speaking counting device and said interconnecting means, and means whereby said manually operable control device simultaneously initiates operation of said counting indicator and said independent driving means so that said indicator and said audible counting device will operate synchronously following manual operation of said manually operable control device.

ROBERT STEENECK.
ROBERT F. DIRKES.
ROY B. WHITE.